United States Patent [19]

Tsunashima et al.

[11] 4,410,582
[45] Oct. 18, 1983

[54] MULTI-LAYERED POLYOLEFIN LAMINATED FILM

[75] Inventors: Kenji Tsunashima, Kyoto; Toshiya Yoshii, Ohtsu; Takeo Fukuyama, Hikone, all of Japan

[73] Assignee: Toray Industries, Inc., Tokyo, Japan

[21] Appl. No.: 327,202

[22] Filed: Dec. 3, 1981

[30] Foreign Application Priority Data

Dec. 10, 1980 [JP] Japan ................................ 55-173171
Jun. 12, 1981 [JP] Japan ................................ 56-89658

[51] Int. Cl.$^3$ ................................................. B32B 7/02
[52] U.S. Cl. ...................................... 428/212; 428/215; 428/354; 428/516; 428/910; 428/323
[58] Field of Search .............. 428/516, 354, 212, 910, 428/215

[56] References Cited

U.S. PATENT DOCUMENTS

| | | | |
|---|---|---|---|
| 3,887,745 | 6/1975 | Yoshi et al. ........................ | 428/213 |
| 4,242,396 | 12/1980 | Wilson et al. ...................... | 428/141 |
| 4,252,851 | 2/1981 | Lansbury et al. .................. | 428/336 |
| 4,294,889 | 10/1981 | Hashimoto ......................... | 428/515 |

*Primary Examiner*—George F. Lesmes
*Assistant Examiner*—P. R. Schwartz
*Attorney, Agent, or Firm*—Armstrong, Nikaido, Marmelstein & Kubovcik

[57] ABSTRACT

A three-layered laminated film consisting essentially of (A) a center layer consisting of a crystalline low molecular weight polyolefin having an intrinsic viscosity of 0.5 to 1.4 and (B) two surface layers disposed on both sides of the center layer and each consisting of a crystalline polyolefin (b) having a melting point higher than that of the crystalline low molecular weight polyolefin (a), whereby the thickness of the center layer (A) accounts for 30 to 98%, especially 50 to 85%, of the total thickness of the laminated film. The invention also relates to applications of the laminated film.

The laminated film of the invention has excellent finger-tearability and high toughness but little tendency to curl, to whiten when torn, to get turbid and fibrillated, and so forth. The laminated film is effectively used as an adhesive tape or other applications.

37 Claims, No Drawings

MULTI-LAYERED POLYOLEFIN LAMINATED FILM

BACKGROUND OF THE INVENTION (1) Field of the Invention

This invention relates to an easily finger-tearable polyolefin laminated film. More particularly, the present invention relates to a multi-layered polyolefin laminated film which is easily finger-tearable and excellent in practical strength and is devoid of such drawbacks as curling, whitening when torn, fibrillation, and so forth.

(2) Description of the Prior Art

Various methods of producing a polyolefin film having excellent finger-tearability have been proposed in the past such as a method which laminates a uniaxially oriented film (hereinafter referred to as a "UO film") oriented in the transverse direction on a biaxially oriented film (hereinafter referred to as a "BO film") (e.g., U.S. Pat. No. 3,887,745), a method which radiates radioactive rays such as electron beams to the BO film (e.g., Japanese Patent Application Laid-Open No. 106779/1978), a method which interposes a thermoplastic resin layer having a second order transition point of 40° to 130° C. and elongation at tensile break at 20° C. of up to 30%, such as of polystyrene and polymethacrylic acid alkyl ester polymers, between two polypropylene layers (e.g., Japanese Patent Application Laid-Open No. 28814/1980), and so forth. The laminated films thus produced are used for an adhesive tape, for packaging flowers and other applications where finger-tearability is required. However, these laminated films have the following drawbacks. In the case of the laminated film consisting of the BO/UO films, the film gets turbid and undergoes whitening when cut. The cut portion partially remains unremoved and miscut is likely to occur. When heated to 40° to 50° C., the laminated film substantially loses finger-tearability and has a tendency to curl. In addition, the productivity of the film is low. In the case of the electron beam radiation method, the resulting laminated film fails to satisfy the requirements of finger-tearability and toughness. Even if the film has finger-tearability, the surface layer of the film is likely to undergo cleavage. The three-layered film interposing the polystyrene or polymethacrylate layer between the two polypropylene layers involves the drawbacks of low adhesion between these layers, easy cleavage, low transparency and low resistance both to chemicals and heat. Moreover, since the waste can not be recovered during the film manufacturing process, the productivity of the film is also low.

SUMMARY OF THE INVENTION

It is therefore an object of the present invention to provide a laminated film which eliminates these drawbacks with the prior art, is excellent in both finger-tearability and toughness, is devoid of the problems of curling, hazing, whitening and cleavage and yet has high productivity.

It is another object of the present invention to provide a variety of applications of this film having excellent finger-tearability and more specifically, to provide an adhesive tape having excellent finger-tearability.

The present invention relates to a multi-layered film of a three-layered structure consisting essentially of (A) a center layer consisting of a crystalline low molecular weight polyolefin (a) having an intrinsic viscosity of 0.5 to 1.4 and (B) two surface layers disposed on both sides of the center layer (A) and each consisting of a crystalline polyolefin (b) having a melting point higher than that of the crystalline low molecular weight polyolefin (a), whereby the thickness of the center layer (A) accounts for 30 to 98%, especially 50 to 85%, of the total thickness of the laminated film. The present invention also relates to applications of the laminated film.

DESCRIPTION OF THE PREFERRED EMBODIMENTS

It is essentially necessary that the melting point $T_{mb}$ of the crystalline polyolefin (b) is higher than the melting point $T_{ma}$ of the crystalline low molecular weight polyolefin (a). The difference of the melting points, i.e., $T_{mb} - T_{ma} = \Delta T_{mab}$, is preferably from 5 to 50, and more preferably, from 10 to 30 (°C.). If the $\Delta T_{mab}$ value is too small, the film does not have finger-tearability at all or even if it does, miscut is likely to occur and the vicinity of the cut edge undergoes deformation, inhibiting beautiful cut. If the value is too great, on the other hand, not only the properties of the laminated film such as mechanical strength, stiffness, toughness and thermal dimensional stability would be lowered but also its finger-tearability would be reduced so that the vicinity of the cut edge surface partially elongates and undergoes whitening and hazing. If these polymers are non-crystalline and their melting points can not be detected, their softening points may be used as the melting points herein used. If two or more polymers are blended and two or more melting points exist, the melting point of the polymer which accounts for at least 50% of the polymer composition is used as the melting point of the copolymer in the present invention.

The intrinsic viscosity $[\eta]_a$ of the crystalline low molecular weight polyolefin (a) must be from 0.5 to 1.4, preferably from 0.7 to 1.2 and more preferably, from 0.8 to 1.1. It is one of the characterizing features of the present invention that $[\eta]_a$ is small. However, if $[\eta]_a$ is less than 0.5, the laminated film becomes brittle. In the extreme case, film forming capacity is lost and a uniform film can not be formed. Peel between layers, that is, cleavage, is likely to occur and film forming characteristic becomes extremely lowered and productivity is markedly reduced. If the $[\eta]_a$ value is greater than 1.4, the laminated film can no longer be finger-tearable.

Though the intrinsic viscosity of the crystalline polyolefin (b) is not restrictive, in particular, a value within the range of 0.5 to 2.0, preferably 0.8 to 1.5, is selected in view of toughness, impact resistance and cleavage resistance. To facilitate coextrusion, the intrinsic viscosity, of the crystalline polyolefin (b) is 1.2–0.8 times, preferably 1.1–0.9 times of the intrinsic viscosity of the crystalline low molecular weight polyolefin (a) within the above-mentioned range.

The term "intrinsic viscosity" represents the intrinsic viscosity of the polymer forming each layer of the laminated film after completion of production of the film. Generally, the intrinsic viscosity of the polymer drops when the polymer is melt-extruded into a film.

It is another characterizing feature of the present invention that the thickness of the center layer is relatively greater than that of the conventional three-layered laminated films. In order to obtain finger-tearability of the laminated film, it is necessary that the ratio $(t_2/t_0 \times 100)$ of the thickness $t_2$ of the center layer (A) consisting of the crystalline low molecular weight polyolefin (a) to the total thickness $t_0$ of the laminated film is 30 to 98%, preferably 50 to 85%. The thickness of each surface layer (B) consisting of the crystalline polyolefin (b) need not be the same but is preferably equal to that of the other in view of curling of the laminated film. Within the above-mentioned range of thickness ratio, the thickness of the center layer (A) consisting of the crystalline low molecular weight polyolefin (a) is preferably 5 to 90 μm, more preferably 5 to 50 μm and especially preferably, 10 to 40 μm. If the thickness is lower than this range, practical strength of the film becomes insufficient and workability in handling the film is reduced because the film is too thin. If the thickness is beyond this range, tearability of the film in an arbitrary direction becomes insufficient.

The thickness of each surface layer (B) is preferably 0.5 to 20 μm, more preferably 0.5 to 8 μm and especially preferably, 0.5 to 5 μm. If the thickness is lower than this range, the film does not have sufficient practical strength and if it is beyond this range, on the contrary, tearability of the film in an arbitrary direction becomes insufficient. It is preferred that the kind or thickness of the surface layer (B) is the same for both of the two layers, but a different kind of polymer or a polymer having a different thickness may be employed within the above-mentioned range. To improve practical strength as well as tearability of the film, it is extremely preferred that the surface layer (B) is biaxially oriented. From the aspects of tearability and practical strength, it is more advantageous that the center layer (A) and the surface layers (B) are directly laminated in such a state in which the polymers are mutually fused. If an adhesive layer is interposed between both layers, it is preferred that the thickness of the adhesive layer be as thin as possible.

Though the center layer (A) may be unoriented, uniaxially oriented or biaxially oriented, it is preferably biaxially oriented. However, molecular orientation of the center layer (A) is preferably relaxed by heat-treatment so as to be lower than the orientation of the surface layers (B).

The crystalline low molecular weight polyolefin (a) to be used for the center layer (A) of the laminated film of the present invention is an olefinic copolymer or homopolymer. Examples of the copolymer include copolymers of propylene and other olefins ($C_2$ and $C_{4-10}$; propylene content=at least 50 mol%, preferably 70 to 99.5 mol%); copolymer of ethylene and other olefins ($C_{3-10}$; ethylene content=at least 50 mol%, preferably 70 to 99.5 mol%); copolymers of butene-1 and other olefins ($C_2$, $C_3$ and $C_{5-10}$; butene-1 content=at least 50 mol%, preferably 70 to 99.5 mol%); copolymers of 4-methylpentene-1 and other olefins ($C_{2-10}$; 4-methylpentene-1 content=at least 50 mol%, preferably 70 to 99.5 mol%); and so forth. (The term "copolymer" includes not only the copolymer, but also the terpolymer and polymers of four or more component polymers. The copolymerization system may be either random copolymerization or block copolymerization.) Examples of the above-mentioned homopolymer include homopolymers of $C_2$ to $C_{10}$ olefins such as propylene, ethylene, butene-1, 4-methylpentene-1, and so forth. As described already, these copolymers and homopolymers have an intrinsic viscosity of 0.5 to 1.4, preferably 0.7 to 1.2 and especially preferably 0.8 to 1.1.

In the present invention, the copolymer is preferred to the homopolymer, and especially preferred is a propylene copolymer containing at least 50 mol% of propylene. Among the propylene copolymers, especially preferred are an ethylene-propylene copolymer, an ethylene-propylene-butene copolymer and a propylene-butene copolymer.

In conjunction with the polymerization system, the random copolymer is preferred to the block copolymer. Most preferred is an ethylene-propylene random copolymer. Other polymers may be additionally blended within such a range in which the properties of the copolymer are not drastically changed. In the case of the film of the present invention, the requirements of toughness and finger-tearability can be satisfied if a crystalline low molecular weight polyolefin (a) prepared by blending 5 to 40% by weight, preferably 10 to 30% by weight, of the crystalline polyolefin (b) to the aforementioned crystalline low molecular weight polyolefin (a), is used for the center layer (A). In such a case, the laminated film can be obtained with high productivity.

The crystalline polyolefin (b) to be used for the surface layers (B) of the film of the present invention is a homopolymer or copolymer of olefins of up to 10 carbon atoms. Preferred examples are homopolymers of propylene, ethylene, butene-1 and 4-methylpentene-1. Especially, polypropylene is the most suitable material for the film of the present invention because it is excellent in both quality and producibility such as transparency, inter-layer adhesion, and so forth.

These copolymers may be used under the condition that their melting points are higher than the melting point of the polymer of the center layer (A).

Especially when one of the surfaces of the surface layer (B) is roughened to provide a film having a matted surface, an ethylene-propylene block copolymer is preferred as the polymer to be used for the surface layer having the matted surface.

Incidentally, the term "crystalline" used for the crystalline low molecular weight polyolefin (a) and the crystalline polyolefin (b) represents a degree of crystallinity of at least 30%. In the present invention, polymers having a degree of crystallinity of at least 40% are especially used. The degree of crystallinity ($x_c$) can be estimated by a known method by measuring the density d of the polymer. Namely, the degree of crystallinity can be calculated in accordance with the following equation, in which $d_c$ is a crystal density and $d_a$ is a non-crystal density:

$$x_c = \frac{d_c(d - d_a)}{d(d_c - d_a)} \times 100(\%)$$

Various known additives for polymers such as antioxidants, antistatic agents, heat stabilizers, lubricants, ultraviolet absorbers, fillers, tackifiers, surface roughening agents, and the like may be added to each layer of the center layer (A) and surface layers (B). Especially when the surface roughening agent is added to one of the surface layers (B), the resulting laminated film will have drawability.

Next, the method of producing the film of the present invention will be described, but it is not necessarily restricted to the following embodiment. The crystalline polyolefin (b) and the crystalline low molecular weight polyolefin (a) are fed to two or three extruders, respectively. After the polymers are molten, they are passed through a three-layer laminating adaptor and a three-layered molten polymer consisting of (b)/(a)/(b) is extruded from a die and is then cooled for solidification on a cooling drum in accordance with a known method. In this case, 0.001 to 0.5% by weight, preferably 0.05 to 0.3% by weight, of a nucleating agent is added to at least one of the polymers (a) and (b), preferably to the polymer (b), in order to improve the transparency of the resulting film.

The term "nucleating agent" used herein is defined in the following manner. When a certain polymer is perfectly molten and its temperature is gradually lowered by a scanning type differential calorimeter (DSC), an exothermic peak resulting from crystallization of the polymer occurs during the temperature lowering process. If a certain kind of substance is added in advance to the polymer, the temperature of the exothermic peak shifts to a higher temperature side. The substance having the shifting action of the exothermic peak temperature to the higher temperature side is hereby defined as the "nucleating agent". For example, when polypropylene is molten and its temperature is lowered by the DSC, the exothermic peak occurs at about 95° C. If about 0.2% by weight of dibenzylidene sorbitol is added to polypropylene, the exothermic peak shifts by about 15° C., to the higher temperature side.

Accordingly, this dibenzylidene sorbitol can be called the "nucleating agent". Examples of the nucleating agents that can be used in the present invention include dibenzylidene sorbitol and its derivatives, sodium benzoate, aluminum benzoate, sodium naphthenate, sodium cyclohexanecarboxylate, silica, talc, zeolite, kaolin, and the like. Of these, especially preferred are dibenzylidene sorbitol derivatives.

As a method of stretching the sheet, known stretching methods such as uniaxial stretching, simultaneous biaxial stretching and sequential biaxial stretching may be employed. The stretching ratio of 1.5 to 15 times in each longitudinal and transverse direction, and preferably biaxial stretching is made 2 to 10 times. The preferred stretching temperature is from [melting point of the polymer of the center layer (A) −10]°C. to the melting point of the polymer of the surface layers (B). Next, the biaxially stretched film is heat-treated at a temperature within the range from the melting point of the polymer for the center layer (A) up to the melting point of the polymer for the surface layers (B), for 3 to 30 seconds. This heat-treament may be either heatset under tension in which the film is heatset while kept under tension, or heatset under relaxation in which the film is heatset while being relaxed by 1 to 20% of the original length in the longitudinal direction and/or in the transverse direction of the film. Combination of these heat-treatments may also be used. Next, the known surface activation treatment such as corona discharge treatment or the like is applied to one or both surfaces of this film so as to attain a surface wetting tension of 35 to 50 dyne/cm.

In accordance with the production method of the film described above, or by combining properly the intrinsic viscosity and melting point of each polymer, the thickness of each layer, the molecular orientation by the stretching and the heat-treating conditions, the three-layered laminated film of the present invention has a Charpy impact value (P) of up to 5 kg-cm/cm, preferably up to 3 kg-cm/cm and the value obtained by reducing the birefrigence (ΔA) from the absolute value of the difference between the refractive index ($N_{MD}$) in the longitudinal direction of the film and the refractive index ($N_{TD}$) in the transverse direction, of 0.002 to 0.02, preferably 0.003 to 0.01.

Unless the Charpy impact value is up to 5 (kg-cm/cm), preferably up to 3 (kg-cm/cm), the film will not have preferable finger-tearability. Even if it does, miscut is highly likely to occur, and the vicinity of the cut edge undergoes deformation and can not provide beautiful clear cut. When examination in further detail is made, the Charpy impact value is found to be closely related with the finger-tearability, as tabulated in Table 1.

TABLE 1

| Charpy impact strength (kg-cm/cm, sheet thickness) | Finger-tearability | Symbol |
| --- | --- | --- |
| 0–0.5 | Can be cut extremely easily like paper. | ◎ |
| 0.6–1.0 | Can be cut easily. | ◎ |
| 1.1–3.0 | Can be cut relatively easily. | ○ |
| 3.1–5.0 | Can be cut one way or another. | Δ |
| 5.1– | Can not be cut easily. | X |

It is preferred that the value, which is obtained by reducing the birefrigence Δn as the difference between the major axis and minor axis inside the plane determined by a polarization microscope from the absolute value of the difference between the refractive index ($N_{TD}$) in the transverse direction (TD) of the film of the invention and the refractive index ($N_{MD}$) in the longitudinal direction (MD), is from 0.002 to 0.02, preferably from 0.003 to 0.01. If this requirement is satisfied, the drawbacks such as hazing and whitening of the film when cut, and curl and elongation of the end portion can be prevented. To prevent hazing of the film when cut, it is preferred that the center layer (A) has birefringence $\Delta n_A$ of at least 0.002 and the birefrigence $\Delta n_B$ of the surface layers (B) is greater than $\Delta n_A$ and within the range of 0.004 to 0.030.

The multi-layered laminated film in accordance with the present invention provides the following excellent effects.

(1) The film is finger-tearable in an arbitrary direction.
(2) It has high practical strength.
(3) It has excellent solvent- and heat-resistance.
(4) The film surface can be smooth or matted, hence, the film has a wide range of applications.
(5) Having a small heat shrinkage ratio and low hygroscopicity, the film has high dimensional stability.
(6) It does not show curl-tendency.
(7) When used as the base of an adhesive tape, the film provides high cuttability by a dispenser.
(8) When the film is cut with a finger or by a dispenser, the cut end does not undergo whitening or fibrillation but provides clear cut.

Because of these effects, the film of the present invention can be used effectively at the base of an adhesive tape, as paper for tracing paper, generally packaging use such as flower packaging, and as a lined sheet of PTP packaging by vacuum coating aluminum or the like.

Though the possible applications of the multi-layered laminated film of the present invention will next be described, the applications are not restricted to the following description, in particular.

If an adhesive agent is coated onto at least one surface of the multi-layered laminated film of the present invention, there can be obtained an easily finger-tearable polyolefin adhesive tape, the cut end of which does not undergo curling, whitening and fibrillation.

There is no restriction, in particular, to the kinds of adhesive agent which is to be coated to at least one surface of the multi-layered laminated film of the invention. Examples of adhesive agent include natural rubber, synthetic rubber, polyacrylic esters, polyvinyl ether, and so forth. It is also possible to use a solution type adhesive agent which is to be dissolved in an organic solvent and a thermosensitive hot-melt type adhesive agent. Of them, especially preferred is an adhesive agent of an acrylic type copolymer.

In the adhesive tape in which this adhesive agent is coated to only one surface, it is further preferred that the surface layer (B) of the opposite surface to the adhesive layer is matted.

The one side matted film will be described hereinafter.

By roughening one surface of the surface layer (B) in the surface roughness of 3 to 20 μm, a matted multi-layered polyolefin laminated film can be obtained. This matted film has finger-tearability in an arbitrary direction and practical strength and is excellent in drawability and suitability for copying. The standard of the surface roughness is a maximum height value Rmax measured in accordance with JIS B0601-1976. If the surface roughness is below 3 μm, no matting effect can be obtained and the surface does not scatter the light but reflects is so that drawability is improved but suitability for copying is lowered. That is to say, since the reflectivity of paper is different from that of the film of this invention, there occurs a problem that a corrected portion becomes remarkable when copied.

To matt the surface of the thin film layer, the various known methods such as described below may be employed. Especially preferred is a method which adds 1 to 25%, based on the polymer, of inorganic particles having a particle size of 0.1 to 10 μm, preferably 0.5 to 5 μm, to the polyolefin forming the surface layer (B). Examples of suitable inorganic fine particles include calcium carbonate, magnesium carbonate, magnesium oxide, alumina, silica, aluminum silicate, kaolin, kaolinite, talc, clay, diatomaceous earth, dolomite, titanium oxide, zeolite, and so forth.

As the polymer for the surface layer (B) incorporating the inorganic fine particles, it is extremely preferred to use a block copolymer of propylene and other olefins, especially ethylene. Polypropylene is also preferred.

If the block copolymer is used, it is especially preferred that propylene accounts for 95 to 65% by weight. If the propylene-ethylene block copolymer is used, the block copolymer and the random copolymer can be distinguished by examining the infrared spectra at 720 cm$^{-1}$ and 731 cm$^{-1}$. The absorption at 720 cm$^{-1}$ results from ethylene while the absorption at 731 cm$^{-1}$ results from the propylene chains. In practice, however, both absorptions can be observed. The block copolymer suitable for the present invention has a ratio A/B of absorbance A at 720 cm$^{-1}$ to absorbance B at 731 cm$^{-1}$ in the range of 0.4 to 3.0, preferably 0.6 to 2.0.

A heat-sealable polyolefin laminated film can be obtained by laminating a 0.5 to 5 μm thick layer consisting of a heat-sealable polymer having a melting point of 80° to 140° C. to one or both surfaces of the multi-layered laminated film of the present invention.

If the film of the present invention is subjected to the corona discharge treatment by impressing an a.c. energy of 20 to 150 Watt-min·per square meter of the film in an gaseous atmosphere consisting substantially of nitrogen and having an oxygen concentration of up to 0.1 vol% at a reduced, normal or elevated pressure, at least two amino-type and/or imino-type nitrogens per 100 carbon atoms of the base polymer can be introduced into the surface layer portion within 100 Å depth from one or both surfaces of the laminated film. The resulting film has excellent printability, antistatic property and adhesion and is capable of exhibiting hot water resistance in such applications where the film is immersed in hot water.

If paper or a metal foil is bonded to one or both surfaces of the multi-layered laminated film of the present invention, a packaging film or an adhesive tape base film can be obtained.

It is also possible to obtain a packaging film having excellent gas barrier property by vacuum coating or spattering a metal such as aluminum, copper, chromium, nickel, silver or platinum in a thickness of 10 to 100 μm, preferably 40 to 100 μm.

The methods of measuring various characteristic values in the present invention are tabulated below.

(1) Intrinsic Viscosity 0.1 g of each polymer is perfectly dissolved in 100 ml of tetralin at 135° C., and the solution is measured by a Fitz-Simmons type viscometer in a thermostat at 135±0.05° C. to determine the specific viscosity S. The intrinsic viscosity is calculated in accordance with the following equation:

$$\text{intrinsic viscosity} = S/[0.1(1+0.22S)]$$

In the present invention, the intrinsic viscosity of the polymer forming the center layer (A) or the surface layer (B) of the film is a value measured in accordance with the above-mentioned method by sampling 0.1 g of the polymer forming each layer. Accordingly, if the layer consists of a polymer mixture, the value obtained by use of 0.1 g of the polymer mixture is used as the intrinsic viscosity of each layer of the film.

(2) Melting Point 5 mg of each polymer is set in a Differential Scanning Colorimeter (Model DSC-II, a product of Parkin-Elmer Co.) and is heated in the nitrogen atmosphere up to 290° C. (at rate of 20° C./min). After the polymer is held at 290° C. for 60 seconds, the sample is withdrawn and is immediately put into liquid nitrogen for quenching. The sample is again set to the measuring cell and is heated at a rate of 20° C./min so as to determine the melting point of the polymer by the temperature of the peak portion of the endothermic peak due to fusing of the crystal. If the polymer is a polymer mixture or a block copolymer and has at least two peaks, the temperature of the peak portion of the highest peak is regarded as the melting point of the polymer.

(3) Softening Point

A value measured is accordance with the Vicat testing method (ASTM D 1525).

(4) Charpy Impact Value

A value determined by a Charpy impact tester by dividing the energy E (kg-cm) required for cutting the test-piece by the width (cm) of the sample, in accordance with the following equation:

$$E = WR(\cos\beta - \cos\alpha)$$

where
W: hammer weight (kg),
R: distance from the center axis of rotation of the hammer to the center of gravity (cm),
α: lifting angle of the manner,
β: swing-up angle of the hammer after cutting the testpiece.

(5) Refractive Index

The refractive index is measured by using an Abbe's refractometer, Na-D ray as the light source and methyl salicylate as a mounting solution to measure a refractive index in a specific direction by changing the direction of a polarizer in accordance with the total reflection method.

(6) Birefringence

Retardation is first determined by using Na-D ray as the transmitted light and also using a compensator. The value thus obtained is divided by the film thickness.

(7) Evaluation of Whitening

The film is fixed by a Tension clip so that it becomes 10 mm wide and 100 mm long. The film is then extended to reach 110 mm at an extension rate of 10 mm/min at 25° C. Those samples of which haze values exceed 70% is evaluated as undergoing whitening.

(8) Falling Ball Impact Strength

Measurement is carried out after the film is left standing over a night inside a thermo-chamber of 20±0.5° C. The film is fixed under tension to a frame of a 5 cm diameter. A steel ball (of a 38.1 mm diameter) is dropped from 2 m immediately above the film and the falling speed of the ball immediately after it breaks the film is measured by a photoelectric tube. This speed is V (cm/sec). The falling speed of the ball when no film exists is $V_o$ (cm/sec). The energy required for breaking the film (or, the falling ball impact strength) can be determined by the following equation:

$$\text{falling ball impact strength (kg·cm)} = M(V_o^2 - V^2)/2g$$

where
M: ball weight (kg)
g: gravitational acceleration (980 cm/sec$^2$)

EXAMPLES 1-3

Polypropylene (melting point Tmb=165° C., intrinsic viscosity=1.0) as the crystalline polyolefin (b) and an ethylene-propylene random copolymer (melting point Tma=145° C., ethylene content=3.8 wt.%, intrinsic viscosity=1.0) as the crystalline low molecular weight polyolefin (a) were coextruded in a customary manner into a cast film consisting of a center layer (A) composed of an ethylene-propylene random copolymer and 20% by weight of polypropylene blended to the former and surface layers (B) composed of polypropylene alone and disposed on both surfaces of the center layer (A).

The cast film was stretched to 5 times longitudinally at a stretching temperature $T_1$ and to 8 times transversely at a stretching temperature $T_2$ and was then heat-set at a heat-setting temperature $T_3$ for 4 seconds while being relaxed by 5% transversely. There was thus obtained a 35 micron-thick three-layered laminated film (thickness=3/29/3 microns). The correlationship between the stretching temperatures $T_1$, $T_2$, the heat-setting temperature and the properties of the resulting film was tabulated in Table 2.

TABLE 2

|  | Example 1 | Example 2 | Example 3 |
| --- | --- | --- | --- |
| $T_1$ (°C.) | 150 | 145 | 148 |
| $T_2$ (°C.) | 155 | 150 | 150 |
| $T_3$ (°C.) | 150 | 155 | 160 |
| Finger-tearability | good | good | extremely good |
| Tearing direction | transverse | omnidirectional | omnidirectional |

Thus, films excellent in finger-tearability could be obtained if the stretching temperature $T_1$ in the longitudinal direction satisfied the relation $Tmb=165°$ C.$>T_1>T_{ma}=145°$ C. and the stretching temperature $T_2$ in the transverse direction and the heat-setting temperature $T_3$ satisified the relation $T_2$ or $T_3 \geq T_{ma}=145°$ C. Among the films having high finger-tearability, the films became easily finger-tearability primarily in the transverse direction if the stretching temperature in the longitudinal direction was set to a relatively high temperature and the films were set under the relatively high temperature conditions of both preheating and stretching temperatures in the stretching process in the transverse direction. On the other hand, if stretching was carried out in such a manner as to leave effective molecular chain orientation in both longitudinal and transverse directions during the stretching processes in both directions, respectively, the films could have omnidirectional finger-tearability while maintaining the film toughness. If the heat-setting temperature of this film was further elevated, the film became extremely easily finger-tearable in all directions.

EXAMPLE 4

A three-layered laminated film was produced in the same way as in Example 2 except that the construction of the film thickness and the film thickness itself were changed. The quality of the resulting film was tabulated in Table 3.

TABLE 3

| Evaluation time | Unit | Film quality |
| --- | --- | --- |
| Film thickness | μm | 60 |
| Thickness construction [(A)/(B)/(A)] | μm | 10/40/10 |
| Tear strength (longitudinal/transverse direction) | kg/mm$^2$ | 7.3/11.0 |
| Elongation at break | % | 60/30 |
| Young's modulus | kg/mm$^2$ | 155/200 |
| Charpy impact strength | kg-cm/cm | 0.9/1.14 |
| Heat shrinkage (120° C., 15 min.) | % | 0.5/0.3 |
| Curl |  | nil |
| Haze | % | 3.0 |
| Transparency |  | good |
| $|N_{TD} - N_{MD}| - \Delta n$ |  | 0.008 |

When the resulting laminated film was used as a base film of an adhesive tape, there could be obtained a film which was excellent in finger-tearability while maintaining toughness and when the film was cut, th cut face did not undergo whitening and elongation. Even when the ambient temperature was high, the finger-tearability of the film did not become deteriorated, and the film did not curl. When cut by a dispenser, the film did not exhibit miscut and whiskers.

EXAMPLE 5

Polypropylene (melting point = 165° C., intrinsic viscosity = 1.0) as the crystalline polyolefin (b) and an ethylene-propylene random copolymer (melting point = 145° C., ethylene content = 3.7 wt%, intrisic viscosity = 1.0) as the crystalline low molecular weight polyolefin (a) were coextruded in a customary manner into a cast film consisting of a center layer (A) composed of the ethylene-propylene copolymer and 40% by weight of polypropylene (b) blended to the former and surface layers (B) composed of the polypropylene (b) and 20% by weight of the ethylene-propylene copolymer (a) blended to the former and disposed on both surfaces of the center layer (A) (i.e. a three-layered structure of (B)/(A)/(B). The resulting cast film was stretched to 7 times longitudinally at a stretching temperature of 140° C. and to 8 times transversely at a stretching temperature of 150° C. The film was then heat-set at a heat-setting temperature of 155° C. for 13 seconds while being relaxed by 5%. There was thus obtained a 35 micron-thick laminated film. The characteristics of this film were tabulated below and the film was devoid of the problems of whitening and haze.

$N_{TD}$: 1.5140
$N_{MD}$: 1.5039
$\Delta n$: 0.005
$|N_{TD} - N_{MD}| - \Delta n$: 0.0051
Charp impact strength: 2.5 kg-cm/cm
Finger-tearability: good
Whitening when cut: nil

EXAMPLE 6

The following two kinds of polymers were prepared.
Polymer A: propylene-ethylene random copolymer, ethylene content 2.9 wt%, intrinsic viscosity 1.2, melting point 150° C., antioxidant = 0.2 wt% of 2,6-di-t-butyl-p-cresol, antistatic agent = 0.6 wt% of monoglyceride stearate of at least 99% purity, and nucleating agent = 0.2 wt% of dibenzylidene sorbitol.
Polymer B: propylene homopolymer, intrinsic viscosity 1.15, melting point 164.5° C., isotacticity index 97.2%, 0.2 wt% of the same antioxidant as above, and 0.1 wt% of fine silicon oxide particles of a particle diameter of 2 to 3 microns as the antiblocking agent.

These two kinds of polymers were fed to two separate extruders and melt-extruded at 200° C. The molten polymers were allowed to join together inside a three-layer laminating die having three manifolds to form a three-layered laminated sheet composed of the center layer of the polymer X and both surface layers of the polymer B. The sheet was withdrawn from the die and was immediately brought into contact with a quenching drum having a surface temperature of 35° C. for quenching and solidification. After being brought into contact with a pre-heating roll at 145° C., the three-layered laminated sheet was rapidly heated by an infrared heater, then stretched to 6.5 times longitudinally and immediately brought into contact with a quenching roll of 20° C. for quenching. After the resulting uniaxially stretched sheet was sufficiently preheated with hot air, it was stretched to 8 times transversely and while being kept under tension, it was heat-set in the hot air of 155° C. for 5 seconds. In the same hot air, the film was heat-set with 6% widthwise relaxation for 3 seconds, and it was then heat-set for 3 seconds under tension inside the same hot air. Thereafter, the film was gradually cooled down to room temperature (average cooling rate 30° C./sec). The center layer of the resulting film was 29 micron thick, both surface layers were 3 micron thick, respectively, and the total thickness of the three-layered laminated film was 35 microns.

The center layer of this film had an intrinsic viscosity of 1.18 and a melting point of 150° C., white the surface layers had an intrinsic viscosity of 1.00 and a melting point of 164° C. The film was transparent and finger-tearable in an arbitrary direction. The falling ball impact strength of this film was 16 kg-cm and the film had sufficient practical strength for ordinary applications. The Charpy impact strength of this film was 1.1 kg-cm/cm and the $|N_{TD} - N_{MD}| - \Delta n$ value was 0.007.

A 12 mm-wide adhesive tape was produced by coating a mold releasing agent to one surface of the resulting laminated film and an acrylic type adhesive to the other surface. The tape was easily finger-tearable and provided clear cut when it was cut with a dispenser having saw-tooth edges. The cut face by the dispenser was beautiful and hardly caused such problems as whitening and fibrillation. The tape hardly curled and was easy to use.

EXAMPLE 7

The following two kinds of polymers were prepared.
Polymer A: propylene-butene-1 random copolymer, butene-1 content 6 wt%, intrinsic viscosity 0.90, melting point 150° C., 0.2 wt% of 2,6-di-t-butyl-p-cresol as an antioxidant and 0.6 wt% of monoglyceride stearate of at least 99% purity as an antistatic agent.
Polymer B: propylene-ethylene block copolymer, ethylene content 23%, ratio of absorbance at 720 $cm^{-1}$ and 731 $cm^{-1}$ in infrared absorption spectra = 1.36, intrinsic viscosity 0.90, melting point 160° C.; incorporating the following compounds as surface roughening agent, antioxidant and plasticizer:
calcium carbonate: 20%
"Irganox 1010" (product of Ciba Geigy): 0.05%
calcium stearate: 0.20%

These two kinds of polymers were fed to two separate extruders and melt-extruded at 200° C. The molten polymers were allowed to join together inside a three-layer laminating die having three manifolds to form a three-layered laminated sheet composed of the center layer of the polymer A and the surface layers of the polymer B. After withdrawn from the die, the resulting sheet was immediately brought into contact with a quenching drum for quenching and solidification while an electrostatic load was being applied to the drum. The three-layered laminated sheet was brought into contact with a pre-heating roll of 145° C. and was sufficiently pre-heated. Thereafter, the sheet was stretched longitudinally to 6.5 times while being rapidly heated by an infrared heater and was then immediately brought into contact with a quenching roll of 20° C. for quenching. After the uniaxially stretched sheet was again preheated sufficiently with hot air of 150° C., it was stretched transversely to 8 times and while being kept under tension, it was heat-set inside the hot air of 155° C. for 5 seconds. The film was further heat-set with 6% relaxation for 3 seconds inside the same hot air and then heat-set under tension for 3 seconds. Thereafter, the film was gradually cooled down to room temperature (average cooling rate=30° C./sec).

The center layer of the resulting film was 29 μm thick and both surface layers were 3 μm thick. The three-layered laminated was 35 μm thick in total. The surface of the film was hazy and the surface roughness (Rmax) as measured in accordance with the method of JIS B 0601-1976 was 6 μm. Letters or characters could be drawn on the surface with a pencil or ball-point pen and they could clearly be copied by a diazo type copying machine. When this film was bonded onto a printed matter in such a fashion that the film surface came into contact with the printed matter, the film provided a clear copy by a copying machine and did not hinder the copying operation. The falling ball impact strength of this film was 17 kg.cm and the Charpy impact strength was 0.8 kg-cm/cm. The film had the $|N_{TD}-N_{MD}|-\oplus n$ value of 0.009 and was easily finger-tearable.

What is claimed is:

1. A multi-layered polyolefin laminated film of a three-layered structure consisting essentially of:
   (A) a center layer being biaxially oriented and consisting of a crystalline low molecular weight polyolefin (a) having an intrinsic viscosity of 0.5 to 1.4; and
   (B) surface layers disposed on both sides of said center layer (A) and each being biaxially oriented and consisting of a crystalline polyolefin (b) having a melting point higher than that of said crystalline low molecular weight polyolefin (a);
   whereby the thickness of said center layer (A) accounts for 30 to 98% of the total thickness of said laminated film.

2. The multi-layer polyolefin laminated film as defined in claim 1 wherein the intrinsic viscosity of said crystalline low molecular weight polyolefin (a) is 0.7 to 1.2.

3. The multi-layered polyolefin laminated film as defined in claim 1 wherein the intrinsic viscosity of said crystalline low molecular weight polyolefin (a) is 0.8 to 1.1.

4. The multi-layered polyolefin laminated film as defined in claim 1 wherein the difference ΔTmab between the melting point Tmb (°C.) of said crystalline polyolefin (b) and the melting point Tma (°C.) of said crystalline low molecular weight polyolefin (a) is 5° to 50° C.

5. The multi-layered polyolefin laminated film as defined in claim 1 wherein ΔTmab is 10° to 30° C.

6. The multi-layered polyolefin laminated film as defined in claim 1 wherein the thickness of said center layer (A) accounts for 50 to 85% of the total thickness of said laminated film.

7. The multi-layered polyolefin laminated film as defined in claim 1 wherein the thickness of said center layer (A) is 5 to 90 μm and that of said each surface layer (B), 0.5 to 20 μm.

8. The multi-layered polyolefin laminated film as defined in claim 1 wherein the thickness of said center layer (A) is 5 to 50 μm and that of said each surface layer (B), 0.5 to 8 μm.

9. The multi-layered polyolefin laminated film as defined in claim 1 wherein the thickness of said center layer (A) is 10 to 40 μm and that of said each surface layer (B), 0.5 to 5 μm.

10. The multi-layered polyolefin laminated film as defined in claim 1 wherein the orientation of said three-layered film is such that the difference obtained by reducing birefringence (Δn) from the absolute value of the difference between the refractive index ($N_{MD}$) in the longitudinal direction of the film and the refractive index ($N_{TD}$) in the transverse direction is 0.002 to 0.02.

11. The multi-layered polyolefin laminated film as defined in claim 1 wherein the orientation of said three-layered film is such that the difference obtained by reducing birefringence (Δn) from the absolute value of the difference between the refractive index ($N_{MD}$) in the longitudinal direction of the film and the refractive index ($N_{TD}$) in the transverse direction is 0.003 to 0.01.

12. The multi-layered polyolefin laminated film as defined in claim 1 wherein the intrinsic viscosity of said crystalline polyolefin (b) is 0.5 to 2.0.

13. The multi-layered polyolefin laminated film as defined in claim 1 wherein the intrinsic viscosity of said crystalline polyolefin (b) is 0.8 to 1.5.

14. The multi-layered polyolefin laminated film as defined in claim 1 wherein said crystalline low molecular weight polyolefin (a) is a olefine copolymer.

15. The multi-layered polyolefin laminated film as defined in claim 1 wherein said crystalline low molecular weight polyolefin (a) is a propylene copolymer.

16. The multi-layered polyolefin laminated film as defined in claim 15 wherein said propylene copolymer contains at least 50 mol% of propylene monomer units.

17. The multi-layered polyolefin laminated film as defined in claim 15 wherein said propylene copolymer is a copolymer of propylene and olefins of 2 to 10 carbon atoms other than propylene.

18. The multi-layered polyolefin laminated film as defined in claim 15 wherein said propylene copolymer is an ethylene-propylene copolymer.

19. The multi-layered polyolefin laminated film as defined in claim 15 wherein said propylene copolymer is a propylene-butene copolymer.

20. The multi-layered polyolefin laminated film as defined in claim 15 wherein said propylene copolymer is an ethylene-propylene-butene copolymer.

21. The multi-layered polyolefin laminated film as defined in claim 15 wherein said propylene copolymer is a random copolymer.

22. The multi-layered polyolefin laminated film as defined in claim 15 wherein said propylene copolymer is a crystalline ethylene-propylene random copolymer.

23. The multi-layered polyolefin laminated film as defined in claim 1 wherein said crystalline polyolefin (b) is at least one polymer selected from $C_2$—$C_{10}$ olefin polymers and copolymers.

24. The multi-layered polyolefin laminated film as defined in claim 1 wherein said crystalline polyolefin (b) of at least one of said two surface layers (B) is a $C_3$—$C_7$ olefin homopolymer.

25. The multi-layered polyolefin laminated film as defined in claim 1 wherein said crystalline polyolefin (b) of at least one of said two surface layers (B) is polypropylene.

26. The multi-layered polyolefin laminated film as defined in claim 1 wherein said center layer (A) consists of a blend mixture of said crystalline low molecular weight polyolefin (a) and 5 to 40% by weight of said crystalline polyolefin (b) added to the former.

27. The multi-layered polyolefin laminated film as defined in claim 1 wherein said center layer (A) consists of a blend mixture of said crystalline low molecular weight polyolefin (a) and 10 to 30% by weight of said crystalline polyolefin (b) added to the former.

28. The multi-layered polyolefin laminated film as defined in claim 1 wherein the Sharpy impact value (p) of said three-layered laminated film is up to 5 kg-cm/cm, and the value obtained by reducing birefringence ($\Delta n$) from the absolute value of the difference between the refractive index ($N_{MD}$) in the longitudinal direction of the film and the refractive index ($N_{TD}$) in the transverse direction is 0.002 to 0.02.

29. The multi-layered polyolefin laminated film as defined in claim 1 wherein the Charpy impact value (p) of said three-layered laminated film is up to 3 kg-cm/cm, and the value obtained by reducing birefringence ($\Delta n$) from the absolute value of the difference between the refractive index ($N_{MD}$) in the longitudinal direction of the film and the refractive index ($N_{TD}$) in the transverse direction is 0.003 to 0.01.

30. The multi-layered polyolefin laminated film as defined in claim 1 wherein at least one of said crystalline low molecular weight polyolefin (a) and said crystalline polyolefin (b) contains 0.001 to 0.5% by weight of a nucleating agent.

31. The multi-layered polyolefin laminated film as defined in claim 1 wherein at least one of said crystalline low molecular weight polyolefin (a) and said crystalline polyolefin (b) contains 0.05 to 0.3% by weight of a nucleating agent.

32. The multi-layered polyolefin laminated film as defined in claim 1 wherein said crysalline polyolefin (b) contains 0.001 to 0.5% by weight of a nucleating agent.

33. The multi-layered polyolefin laminated film as defined in claim 1 wherein said crystalline polyolefin (b) contains 0.05 to 0.3% by weight of a nucleating agent.

34. The multi-layered polyolefin laminated film as defined in claim 1 wherein one of the surfaces of said surface layers (B) is rough with surface roughness of 3 to 20 $\mu$m.

35. The multi-layered polyolefin laminated film as defined in claim 34 wherein said surface layer (B) having said rough surface is polypropylene containing 1 to 25% by weight, based on said polymer, of inorganic particles having a particle size of 0.1 to 10 $\mu$m.

36. The multi-layered polyolefin laminated film as defined in claim 34 wherein said surface layer (B) having said rough surface is an ethylene-propylene block copolymer containing 1 to 25% by weight, based on said polymer, of inorganic particles having a particle size of 0.1 to 10 $\mu$m.

37. The multi-layered polyolefin laminated film as defined in claim 1 wherein at least one surface of said three-layered film is coated with an adhesive agent to form an adhesive tape.

* * * * *